United States Patent
Schulz et al.

(10) Patent No.: US 8,945,431 B2
(45) Date of Patent: Feb. 3, 2015

(54) INTERCALATION OF SILICON AND/OR TIN INTO POROUS CARBON SUBSTRATES

(75) Inventors: Christof Schulz, Köln (DE); Hartmut Wiggers, Reken (DE)

(73) Assignee: Universität Duisburg-Essen, Essen (DE)

( * ) Notice: Subject to any disclaimer, the term of this patent is extended or adjusted under 35 U.S.C. 154(b) by 418 days.

(21) Appl. No.: 13/054,193

(22) PCT Filed: Jul. 14, 2009

(86) PCT No.: PCT/EP2009/005110
§ 371 (c)(1),
(2), (4) Date: Apr. 7, 2011

(87) PCT Pub. No.: WO2010/006763
PCT Pub. Date: Jan. 21, 2010

(65) Prior Publication Data
US 2011/0311873 A1    Dec. 22, 2011

(30) Foreign Application Priority Data

Jul. 15, 2008   (DE) .......................... 10 2008 033 097
Aug. 30, 2008   (DE) .......................... 10 2008 045 231

(51) Int. Cl.
| | | |
|---|---|---|
| H01B 1/04 | (2006.01) | |
| H01M 4/13 | (2010.01) | |
| H01M 4/58 | (2010.01) | |
| C01B 31/00 | (2006.01) | |
| H01M 4/04 | (2006.01) | |
| H01M 4/133 | (2010.01) | |
| H01M 4/134 | (2010.01) | |
| H01M 4/1393 | (2010.01) | |
| H01M 4/1395 | (2010.01) | |
| H01M 4/38 | (2006.01) | |
| H01M 4/587 | (2010.01) | |
| H01M 10/0525 | (2010.01) | |

(52) U.S. Cl.
CPC ............. *C01B 31/00* (2013.01); *H01M 4/0416* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/38* (2013.01); *H01M 4/587* (2013.01); *H01M 10/0525* (2013.01); *Y02E 60/122* (2013.01)
USPC .......................... 252/503; 252/502; 429/231.8

(58) Field of Classification Search
USPC .................. 429/231.8; 252/502, 503; 977/773
See application file for complete search history.

(56) References Cited

U.S. PATENT DOCUMENTS

| | | | |
|---|---|---|---|
| 6,605,386 B1 * | 8/2003 | Kasamatsu et al. | 429/218.1 |
| 2002/0164479 A1 * | 11/2002 | Matsubara et al. | 428/367 |
| 2003/0096163 A1 * | 5/2003 | Miyake et al. | 429/188 |
| 2005/0233213 A1 * | 10/2005 | Lee et al. | 429/218.1 |
| 2006/0040182 A1 * | 2/2006 | Kawakami et al. | 429/218.1 |
| 2006/0172200 A1 * | 8/2006 | Yoon et al. | 429/326 |
| 2007/0281216 A1 * | 12/2007 | Petrat et al. | 429/324 |
| 2010/0099030 A1 * | 4/2010 | Nishida et al. | 429/324 |

FOREIGN PATENT DOCUMENTS

WO    WO2008088050 A1 *   7/2008

OTHER PUBLICATIONS

Stewart et al., "Direct Covalent Grafting of Conjugated Molecules onto Si, GaAs, and Pd Surfaces from Aryldiazonium Salts," web published Dec. 16, 2003, J. Am. Chem. Soc., 2004 vol. 126, pp. 370-378.*

* cited by examiner

*Primary Examiner* — Eugenia Wang

(57) ABSTRACT

The invention relates to a process for producing an electrically conductive, porous, silicon- and/or tin-containing carbon material which is suitable in particular for the production of an anode material, preferably for lithium ion batteries; in a first step of the process, preferably crystalline silicon nanoparticles and/or tin nanoparticles and/or silicon/tin nanoparticles are introduced into a matrix based on at least one organic polymer, being more particular dispersed therein, and subsequently, in a second step of the process, the resultant polymer matrix containing the silicon, tin and/or silicon/tin nanoparticles is carbonized to form carbon.

7 Claims, No Drawings

INTERCALATION OF SILICON AND/OR TIN INTO POROUS CARBON SUBSTRATES

CROSS-REFERENCES TO RELATED APPLICATIONS

This application is a National Stage filing of International Application PCT/EP 2009/005110, filed Jul. 14, 2009, entitled "INTERCALATION OF SILICON AND/OR TIN INTO POROUS CARBON SUBSTRATES" claiming priority to German Applications No. DE 10 2008 033 097.3 filed Jul. 15, 2008, and DE 10 2008 045 231.9 filed Aug. 30, 2008. The subject application claims priority to PCT/EP 2009/005110, and to German Applications No. DE 10 2008 033 097.3, and DE 10 2008 045 231.9 and incorporates all by reference herein, in their entirety.

BACKGROUND OF THE INVENTION

The present invention, relates to the field of lithium-ion battery technology, in particular anode materials suitable in this regard and their production.

The present invention relates in particular to a method for manufacturing an electrically conductive, porous, silicon- and/or tin-containing carbon material as well as the carbon material itself produced in this way and its use in particular for production of anode materials, preferably for lithium-ion batteries.

In addition, the present invention relates to anode materials containing the carbon material according to the invention and/or using the carbon material according to the invention as well as batteries, in particular lithium-ion batteries comprising these anode materials.

Lithium-ion batteries are characterized by very high energy densities. They are thermally stable, supply a constant voltage over the duration of the discharge time and do not have a so-called memory effect. Such batteries are known in the prior art in the form of traditional batteries for a single use as well as in the form of rechargeable batteries.

Lithium-ion batteries generate the electromotive force by displacement of lithium ions. In the charging process, positively charged lithium ions migrate through the electrolyte from a cathode between the graphite planes of an anode, while the charging current supplies the electrons over the external circuit, such that the ions form an intercalation compound of the $Li_xnC$ type with graphite. On discharging, the lithium ions migrate back and the electrons can flow over the external circuit to the cathode.

The term. "intercalation" in the sense of the present invention refers to the intercalation of a mobile-guest species into a host lattice without destroying the structural principle of the host substance and/or the host lattice. The host lattices have layered structures, tubular structures or cage structures, for example, in which the guest substance can be intercalated in a one-, two- or three-dimensional arrangement, often with volume expansion. The intercalation of ions is associated with oxidation or reduction of the host lattice. In electrochemical intercalation, an electronically conductive host as the electrode is anodically or cathodically polarized in the electrolyte, so that anions and/or cations, optionally solvated, move from the electrolyte into the host lattice. This electron/ion transfer reaction results in a mixed conductor, which usually has a better electronic conductivity than the starting material. Electrochemical intercalation reactions are usually reversible and the mobility of the guest ions is high, in particular in host lattices having a layered structure. Intercalation performed in this way includes three basic steps: diffusion or migration of ions, which are usually solvated, to the electrochemical double layer of the host lattice, possible desolvation and subsequent transfer of the ions into free lattice sites near the surface region of the host, and finally, diffusion of the ions into the interior of the lattice.

The concept of intercalation electrodes for electro-chemical current sources has been attracting great interest again, at the latest since the rapid development of rechargeable lithium cells. Intercalation electrodes have been investigated widely since the 1970s for applications in organic and aqueous electrolyte solutions. In other galvanic elements that have already been known of for a long time, e.g., the $Zn/MnO_2$ element and the lead battery, reduction of the cathodic oxides takes place by way of the intercalation of a proton in $MnO_2$ and/or $PbO_2$.

The actual breakthrough in rechargeable lithium batteries was achieved for the first time with the market introduction of a cell which completely omits metallic lithium as an anode material namely the lithium ion cell. Instead of metallic lithium, lithium ion intercalation compounds, for example, lamellar carbon, transition metal oxides or metals forming alloys with lithium are used as the negative active compounds which can reversibly take up and release lithium ions. The positive lithium ion charges are neutralized by electron uptake or release by the host material. In comparison with metallic lithium, the theoretical values for the specific charge in use of an inactive host material are usually much lower.

Since the lithium activity in the intercalation compounds— frequently also called insertion or intercalation compounds— is lower than that of the metallic lithium, i.e., lower than 1, so the electrode potential is also shifted toward less negative values depending on the charge state. However, instead of lithium atoms, lithium ions which are much smaller are used in lithium ion intercalation compounds.

The prerequisite for intercalation of lithium ions in a host lattice material is that the host lattice matrix must be able to allow the uptake of host ions not only sterically but also electronically, i.e., must have a corresponding structure of the energy bands.

The active material of the anode of a conventional lithium-ion battery is made of graphite for example. The cathode contains, for example, lithium metal oxides in a layered structured such as lithium cobalt oxide, lithium nickel oxide or the spinel $LiMn_2O_4$. Lithium-ion batteries must be completely anhydrous because otherwise the water can react with the conductive salt (e.g., $LiPF_6$) to form hydrofluoric acid (HF). Therefore a mixture of anhydrous aprotic solvents is usually chosen.

As mentioned previously, lithium-ion batteries usually do not have the so-called memory effect and also have an extremely low spontaneous discharge or none at all. Lithium-ion batteries are able to supply power to portable electronic devices having a high power demand when these devices would be too heavy or too large for traditional lead batteries, for example, cellular telephones, digital cameras, camcorders or laptops as well as electric vehicles and hybrid vehicles. In the model building sector and in electric power tools, they have already become well established. The usable lifetime of lithium-ion batteries is several years, for example, although that depends greatly on the use and storage conditions.

Because of the positive properties of lithium-ion batteries including lithium ion accumulators as described previously, there has been no lack of attempts in the prior art to develop the technology in this respect further.

It is known from the prior art that silicon, especially in particulate form, may be mixed into a carbon or graphite matrix or otherwise introduced, for example, by gas phase deposition or the like (in this regard, cf. also the documents WO 2005/096414 A2, DE 10 2005 011 940 A1, DE 103 53 996 A1, DE 103 53 995 A1 and DE 10 2006 010 862 A1, for example). It is fundamentally known to those skilled in the art that within the context of lithium-ion batteries, silicon is mechanically degraded and amorphized due to the volume contraction and expansion which occur during charging and discharge processes and ultimately the silicon is no longer available for storage of lithium due to obviously inferior electrical contacting and destruction. The increasingly inferior electrical contacting is counteracted by the intercalation of silicon in a carbon or graphite matrix.

N. Dimovet et al., Journal of Power Sources, 136 (2004, pages 108 ff., describe a method for mechanical mixing of silicon particles approximately 1 µm in size with natural and synthetic graphite.

Kim et al., Journal of Power Sources, 136 (2004), pages 145 ff., describe a method for mechanical mixing of silicon nanoparticies with polystyrene.

Kwon et al., Chem. Commun., 2008, pages 1109 ff., describe a method for coating $Si_{70}Sn_{30}$ nanoalloys with carbon.

WO 2005/096414 A2 describes an electrode material which is produced by mechanical mixing of particles, carbon black and graphite.

An overview of the prior art can be found, for example, in Kasavajjula et al., Journal of Power Sources, 163 (2007), pages 1003 ff.

However, all the methods known in the prior art discuss only the electrical properties or capacitances of the materials.

The mechanical properties of the powder, in particular those with regard to the availability of the expansion volume for silicon are not discussed at all or are discussed only peripherally.

A number of disadvantages are associated with the silicon-containing materials proposed as the anode materials for lithium-ion battery in the prior art: a plurality of silicon-containing anode materials proposed in the prior art tend to cause mechanical degradation and amorphization so that ultimately lithium can no longer be stored due to a lack of electrical contacting. Because of the often inadequate porosity of the matrix and host structure, this matrix and/or host structure often suffers irreversible damage due to the volume contraction that occurs in the charging operation. The materials known in the prior art often do not have adequate mechanical properties, in particular do not have the corresponding strengths.

BRIEF SUMMARY OF THE INVENTION

The object of the present invention is therefore to provide a material suitable as the anode material for lithium-ion batteries and to provide a corresponding method for producing same, such that the disadvantages of the prior art described above are avoided at least partially or they should at least be diminished.

To solve the problem described above the present invention proposes a method described herein. The subject matter of the present invention—according to a first aspect of the present invention—is thus a method according to claim 1. Additional advantageous embodiments of this aspect of the invention are the subject matter of the subsidiary claims in this regard.

Another subject matter of the present invention—according to a second aspect of the present invention—is the materials and/or products obtainable by the method according to the invention, as described herein; additional embodiments of this aspect of the invention are similarly described.

In turn another subject matter of the present invention—according to a third aspect of the present invention—is the use of the materials and/or products as further described herein and obtainable by the method according to the invention.

In addition, another subject matter of the present invention—according to a fourth aspect of the present invention—is an anode material described herein; additional advantageous embodiments of this aspect of the invention are similarly described.

Finally another subject matter of the present invention—according to a fifth aspect of the present invention—is a battery in particular a lithium-ion battery described herein.

It is self-evident that, to avoid repetition, statements made below concerning only one aspect according of the invention also apply to the other aspects of the invention accordingly, even if this is not stated or pointed out explicitly.

It is likewise self-evident that those skilled in the art may deviate from the specific (numerical) values and ranges given, based on the application or in the individual case, without going beyond the scope of the present invention.

DETAILED DESCRIPTION OF THE INVENTION

The subject matter of the present invention—according to a first aspect of the present invention—is thus a method for producing an electrically conductive, porous, silicon- and/or tin-containing carbon material which is suitable in particular for producing an anode material, preferably for lithium-ion batteries, such that in a first process step silicon nanoparticles and/or tin nanoparticles and/or silicon/tin nanoparticles are introduced into a matrix based on at least one organic polymer, in particular being dispersed therein, and subsequently in a second process step the polymer matrix obtained in this way and containing the silicon nanoparticles and/or tin nanoparticles and/or silicon/tin nanoparticles is carbonized to carbon. In other words, the subject matter of the present invention according to this aspect of the invention relates a method for intercalating silicon and tin into porous carbon substrates by the aforementioned process steps. The silicon, tin and/or silicon/tin nanoparticles are preferably introduced and/or intercalated and/or dispersed homogeneously and/or in a uniform distribution in the organic polymer matrix.

A number of advantages are associated with the method according to the invention and the materials and/or products produced with this method, but only a few advantages will be pointed out below.

By intercalating silicon and/or tin into a porous matrix based on carbon, this effectively counteracts the mechanical degradation and amorphization of the crystalline silicon and/or tin which occurs due to volume contraction and expansion during the charging and discharging processes when used as an anode material in particular for lithium-ion batteries, so that the electrical conductivity in particular the ability to store lithium ions, is preserved.

By embedding the silicon and/or tin in a porous carbon matrix, a deterioration of the electrical contacting in particular is also counteracted. The use of nanoscale silicon and/or silicon also makes it possible to effectively counteract destruction of the matrix which occurs due to changes in volume because nanoscale material is much more tolerant in this regard. Embedding nanoscale silicon and/or tin in a porous to highly porous but nevertheless mechanically stable host matrix of carbon ensures on the one hand a good electrical contact between silicon and/or tin and carbon, but on the other hand also allows the silicon and/or tin to "breathe" within this matrix (i.e., allowing free volume expansion due to intercalation of lithium ions in the charging process)

because sufficient volume is available due to the high porosity without the host structure being damaged.

The materials according to the invention also have excellent mechanical properties in particular with regard to the availability of the expansion volume for the silicon and/or tin but also with regard to the mechanical strength for use as an anode material.

On the one hand, a system that is especially stable mechanically and permits adequate volume expansion while on the other hand also having excellent electrical conductivity due to the excellent electrical contact between silicon and/or tin and carbon is made available by intercalation of the silicon, tin and/or silicon/tin nanoparticies in the polymer matrix, in particular by means of in situ polymerization in the presence of the silicon, tin and/or silicon/tin nanoparticies and subsequent carbonization (also referred to by the synonyms "coking," "pyrolysis," "burn-off" or the like).

For the reasons given above, the products obtainable according to the invention are suitable in particular for use as silicon- and/or tin-containing anode materials, preferably for lithium-ion batteries, including accumulators, because despite the volume contraction and expansion occurring during the charging and discharging processes, they do not have a tendency to any mentionable mechanical degradation and amorphization of the silicon and/or tin and/or do not have any such tendency at all and an excellent electrical contacting associated with an excellent ability to store lithium ions is preserved. Due to the adequate porosity of the matrix structure and/or host structure, there is also no irreversible damage to this matrix and/or host structure due to the volume contraction occurring in the charging process. The silicon- and/or tin-containing materials obtainable according to the invention have excellent mechanical properties, in particular appropriate strengths with at the same time good availability of the required expansion volume for the silicon and/or tin.

According to the invention it is thus surprisingly possible to produce materials having such mechanical properties that they directly supply the form of ready-to-use electrodes so that in the production of anodes, it is possible to completely omit the addition of a binder, in particular an organic binder (in general a few wt %) to produce mechanically strong electrodes.

In the method according to the invention as described above, the process management according to the invention leads to an electrically conductive porous carbon material with silicon, tin and/or silicon/tin nanoparticies intercalated into them, i.e., the result is thus porous carbon substrates with nanoparticulate silicon and/or tin intercalated therein.

With regard to the nanoparticies used (i.e., silicon, tin and/or silicon/tin nanoparticies), these are in particular particles having an average particle size ($D_{50}$) in particular an average crystallite size ($D_{50}$) in the range of 1 to 1000 nm in particular 2 to 500 nm, preferably 2 to 250 nm, especially preferably 5 to 100 nm, most especially preferably 5 to 50 nm.

Nanoparticles having an average crystallite size between 1 and 100 nm are especially suitable. Nanoparticles having an average crystallite size between 5 and 50 nm are suitable in particular.

In the case of silicon nanoparticles, aggregated silicon (so-called "hard agglomerates") is especially suitable, as is also unaggregated silicon (so-called "soft agglomerates") each with an average crystallite size between 1 and 100 nm. In this case silicon with an average crystallite size between 5 and 50 nm is especially suitable.

The aforementioned average particle sizes and/or crystallite sizes can be determined, for example, from histograms of transmission electron micrographs or from x-ray diffractograms as well as—for example, in the case of unaggregated silicon—from the BET surface area.

Preferably crystalline silicon, tin and/or silicon/tin nanoparticles produced by gas-phase synthesis, microwave plasma synthesis or the like can typically be used for the purposes according to the invention, for example. Suitable silicon, tin and/or silicon/tin nanoparticles, in particular those that are crystalline, can be obtained, for example, in a microwave plasma in the case of silicon nanoparticles starting from silane or in the case of tin nanoparticles starting from stannan or finally in the case of Si/Sn nanoparticles to be used according to the invention, starting from silane/stannan mixtures or silane/tin tetrachloride mixtures. Those skilled in the art are familiar with this as such so no further details need be given at this point.

As explained above, the silicon, tin and/or silicon/tin nanoparticles to be used according to the invention are usually embodied in a crystalline form. The degree of crystallinity of the silicon, tin and/or silicon/tin nanoparticles used is advantageously at least 70%, in particular at least 80%, preferably at least 90%, especially preferably at least 95% and most especially preferably the silicon, tin and silicon/tin nanoparticles used are embodied in a completely crystalline form.

Silicon, tin and silicon/tin nanoparticles suitable for use according to the invention usually have a PET surface area of 1 to 2000 m$^2$/g, in particular 10 to 1500 m$^2$/g, preferably 25 to 1000 m$^2$/g and especially preferably 50 to 600 m$^2$/g. All the BET values determined and/or mentioned within the scope of the present invention are determined according to ISO 9277 (1995) which replaces DIN 66131.

The silicon nanoparticles used according to the invention may in particular consist of pure silicon but they may also be provided with at least one doping element as described below. In the case of the tin nanoparticles used according to the invention, they may be made or pure tin in particular, but may also be provided with at least one doping element as described below. In the case of the silicon/tin nanoparticles used according to the invention, they may consist in particular of silicon/tin mixtures in any mixing ratio, in particular based on silicon/tin composites or silicon/tin alloys, but the silicon/tin nanoparticles may optionally also be provided with at least doping element, as described below. Nanoparticles based on silicon/tin composites or silicon/tin alloys are preferably used according to the invention. Tin has the advantage of having a good electrical conductivity.

In addition, it is possible for the silicon, tin and silicon/tin nanoparticles that are used, in particular crystalline nanoparticles to be doped and/or to contain at least one doping element. The silicon, tin and/or silicon/tin nanoparticles according to the invention may in particular have a p-type and/or n-type doping, preferably of up to $10^{21}$/cm$^3$, where the doping elements may be selected from Main Groups 3 to 5 of the periodic system of elements (corresponding to groups 13 to 15 of the periodic system of elements according to the new nomenclature) and from elements of the iron group, in particular from the group of boron, aluminum, phosphorus and/or iron as well as mixtures thereof.

It is possible in particular to provide for the silicon, tin and/or silicon/tin nanoparticies to be doped and/or to contain at least one doping element, where this doping element may be selected in particular from the group of phosphorus, arsenic, antimony, boron, aluminum, gallium and/or indium.

The amount of silicon, tin and/or silicon/tin nanoparticies used may vary in wide ranges.

The silicon, tin and/or silicon/tin nanoparticies are generally used within the scope of the method according to the invention in amounts such that the molar silicon and/or tin content (i.e., the molar silicon, tin and/or silicon/tin nanoparticle content) in the electrically conductive, porous, silicon- and/or tin-containing carbon material amounts to 5 to 90 mol %, in particular 10 to 80 mol %, preferably 20 to 70 mol %, based on the electrically conductive, porous, silicon- and/or tin-containing carbon material.

In an advantageous manner according to the invention, the silicon, tin and/or silicon/tin nanoparticles are used in amounts within the scope of the method according to the invention, such that the silicon and/or tin content based on volume (i.e., the volume-based silicon, tin, and/or silicon/tin nanoparticle content) in the electrically conductive, porous, silicon- and/or tin-containing carbon material amounts to 1 to 60 vol %, in particular 2 to 50 vol %, preferably to 4.0 vol %, based on the electrically conductive, porous, silicon- and/or tin-containing material.

The silicon, tin and/or silicon/tin nanoparticies are typically used in such amounts within the scope of the method according to the invention that the silicon and/or tin content based on mass (i.e., the mass-based silicon, tin and/or silicon/tin nanoparticle content) in the electrically conductive, porous, silicon- and/or tin-containing carbon material is 1 to 70 wt %, in particular 2 to 60 wt %, preferably 5 to 50 wt %, based on the electrically conductive, porous, silicon- and/or tin-containing carbon material.

The silicon, tin and/or silicon/tin nanoparticles are advantageously subjected to a surface modification and/or surface functionalization, preferably a hydrophobization prior to being introduced into the organic polymer, in particular before being dispersed in the organic polymer. In particular the surface modification and/or surface functionalization may be performed by alkylsilyl group functionalization, preferably by methylsilyl group functionalization (e.g., trimethylsilyl group functionalization). The functionalization of the surface of nanoparticles the in particular for the purposes of hydrophobization is advantageous to disperse the silicon, in and/or silicon/tin nanoparticles in the polymer and/or the starting monomers in this regard, in particular homogeneously. For functionalization, reactive silanes may be used in particular. Chlorosilanes and hexamethyldisilazane are especially preferred, chlorosilanes of the general formula. $SiCl_xR_{4-x}$ where x=1 to 3 are especially preferred, where the R radical denotes an organic radical, preferably an alkyl radical, preferably having the general formula $C_nH_{(2n+1)}$, especially preferably where n=1 to 6.

According to an especially preferred embodiment, the organic polymer is created in situ in the presence of the silicon, tin and/or silicon/tin nanoparticles. To this end the silicon, tin and/or silicon/tin nanoparticles which have preferably first been surface modified and/or surface functionalized in particular hydrophobized, are dispersed in the corresponding organic monomers and/or solutions or dispersions thereof and then the organic monomers are subsequently polymerized in the presence of the silicon, tin and/or silicon/tin nanoparticles to form the respective organic polymers. The result is an organic polymer matrix in which the silicon, tin and/or silicon/tin nanoparticles are intercalated and/or embedded, preferably in a homogeneous and/or uniform distribution such that this polymer matrix is then subsequently carbonized and/or pyrolyzed as will be described in detail below.

In the previously described special embodiment according to which organic monomers are used which are then polymerized in situ in the presence of the silicon, tin and/or silicon/tin nanoparticles in particular monomers which do not contain any chemically bound oxygen are used. Organic, monomers preferred according to this invention are selected in particular from the group of vinyl chloride, styrene, tetrafluoroethylene, ethylene and/or polypropylene, preferably styrene, especially preferably styrene together with divinylbenzene (in the latter case, divinylbenzene-crosslinked polystyrene is formed after polymerization, as will be described below).

Within the scope of the method according to the present invention, organic polymers which do not contain any chemically bound oxygen are preferably used as the organic polymers which form the matrix for the silicon, tin and/or silicon/tin nanoparticles to be intercalated therein. Chemically bound oxygen is capable of oxidizing a portion of the silicon, tin and/or silicon/tin nanoparticles to silicon dioxide and/or tin oxide in the subsequent carbonization, but these oxides would then be useless for the application as anode material, in particular for lithium-ion batteries. The organic polymers which form the matrix for the silicon, tin and/or silicon/tin nanoparticles to be intercalated therein are selected in a manner preferred according to the invention from the group of polyvinyl, chloride, polyacrylonitrile, polystyrene, polytetrafluoroethylene, polyethylene and/or polypropylene, preferably polystyrene. Divinylbenzene-cross linked polystyrene is especially preferred, in particular with a divinylbenzene content of 0.1 to 20 wt %, preferably 1 to 10 wt %, based on the organic polymer.

It is preferable-according to the invention if the organic monomers and/or the organic polymers are present in sulfonated form and/or contain sulfonic acid groups. The sulfonic acid groups are usually not introduced until after production of the polymer and/or before the process step of carbonization, namely by sulfonation in a known manner. Sulfonic acid groups form free radicals in the subsequent carbonization, leading to the crosslinking which responsible for the good carbon yield in the context of the pyrolysis process. Instead of sulfonic acid groups, fundamentally other chemically suitable groups may also be used, for example, isocyanate groups.

With regard to the intercalation and/or dispersion of the silicon, tin and/or silicon/tin nanoparticies in the organic monomers and/or polymers, this may be performed by those skilled in the art in the usual manner, for example, by stirring, kneading, milling using a ball mill, ultrasonic treatment, extrusion, etc.

According to a special embodiment of the present invention, the polymers containing the silicon, tin and/or silicon/tin nanoparticles may be subjected to a shaping process before the process step of carbonization. For example, the polymers containing silicon, tin and/or silicon/tin nanoparticles may be processed further to molded articles such as spheres, disks, blocks, more complex structures or the like which are subsequently carbonized and/or pyrolyzed so that carbon species having a high specific surface area (BET) with silicon, tin and/or silicon/tin nanoparticies embedded in them are formed as will be described further below.

With regard to the process step of carbonization, which is also referred to by such synonyms as "pyrolysis," "low-temperature carbonization" or the like, the conversion of the polymeric starting material to carbon takes place within the scope of this process step, i.e., in other words, the polymeric starting material containing carbon undergoes carbonization. In carbonization or low-temperature carbonization of the aforementioned polymers, which contain functional chemical groups that form free radicals and thus leading to crosslinking in their thermal decomposition, in particular sulfonic acid groups, the functional chemical groups, in particular the sulfonic acid groups, are destroyed—splitting off volatile component such as $SO_2$ in particular—and free radicals are formed which cause a strong crosslinking without forming any mentionable pyrolysis residue (=carbon).

In general, the carbonization is performed under at least essentially inert conditions, in particular in the absence of oxygen, preferably under an inert gas atmosphere. In this way excessive turnoff is prevented on the one hand while on the other hand unwanted oxidation of the silicon to silicon dioxide and/or oxidation of the tin to tin oxide is/are prevented.

The carbonization is usually performed at temperatures in the range of 300 to 2000° C. in particular 600 to 1200° C., preferably 700 to 1000° C., with periods of time of 0.1 to 20 hours, preferably 0.5 to 10 hours, especially preferably 1 to 5 hours being customary in particular.

The carbonization should not be followed by any more extensive activation step according to the invention such as would otherwise be customary in the production of activated carbon because this would lead to the unwanted oxidation of the silicon and/or tin, as described above.

To further improve the electrical conductivity of the silicon- and/or tin-containing carbon material according to the present invention, it is possible to provide for the addition of graphite and/or at least one conductivity-improving substance, in particular conductive carbon black during the course of the process. The graphite and/or the conductivity-improving substance, in particular conductive carbon black, may be added to the monomers to be polymerized and/or to the polymers. Alternatively the graphite and/or the conductivity-improving substance may also be added to the finished carbon material after carbonization. With respect to a more extensive characterization of the graphites and/or conductivity-improving substances to be added in this quantities to be used in this regard, reference can be made to the following discussion regarding the silicon- and/or tin-containing carbon materials according to the present invention, which are applicable accordingly with respect to the process according to the invention.

The subject matter of the present invention—according to a second aspect or the present invention—is the electrically conductive porous carbon materials containing silicon and/or tin according to the method according to the invention.

In other words, the subject matter of the present invention according to this aspect of the invention is an electrically conductive porous carbon material containing silicon and/or tin, which is suitable in particular for the production of an anode material, preferably for lithium-ion batteries, such that the carbon material containing silicon and/or tin contains silicon nanoparticies and/or tin nanoparticles and/or silicon/tin nanoparticles intercalated into a porous carbon matrix. For more extensive details concerning this aspect of the invention, reference may be made to the preceding discussion of the method according to the invention which also applies here accordingly to the carbon material according to the invention.

As explained above, the carbon material according to the invention is characterized by a high porosity, which permits a problem-free and reversible intercalation of lithium ions because the silicon, tin and/or silicon/tin nanoparticles are readily accessible due to the porosity and furthermore this allows a problem-free volume expansion ("breathing of the silicon and/or tin").

The carbon materials according to the invention in particular are characterized by a porosity, determined as the total pore volume according to Gurvich, in the range of 0.01 to 4 $m^3/g$, in particular 0.1 to 3.5 $m^3/g$, preferably 0.2 to 3 $m^3/g$, especially preferably 0.3 to 2.0 $m^3/g$.

It is especially advantageous if the silicon- and/or tin-containing carbon material according to the invention has a porosity such that at least 10 vol % in particular at least 15 vol %, preferably at least 20 vol % of the total volume of the carbon material is formed by pores and/or is embodied in a porous form. Preferably 10 to 80 vol % in particular 15 to 75 vol %, preferably 20 to 60 vol % of the total volume of the carbon material is formed by pores.

In addition, the carbon materials according to the invention are characterized by a high internal surface area (BET). In particular the carbon materials according to the invention have a BET surface area of 50 to 2000 $m^2/g$ in particular 100 to 1750 $m^2/g$ preferably 200 to 1500 $m^2/g$.

As explained previously the silicon and/or tin and/or nanoparticle content (i.e., silicon, tin and/or silicon/tin nanoparticles) in the carbon materials according to the invention may vary in wide ranges.

For example, the molar silicon content and/or tin content (i.e., the molar silicon, tin and/or silicon/tin nanoparticle content) in the carbon materials according to the invention may vary in the range of 5 to 90 mol %, in particular 10 to 80 mol %, preferably 20 to 70 mol %, based on the carbon material.

In addition, the volume-based silicon and/or tin content (i.e., the volume-based silicon, tin and/or silicon/tin nanoparticle content) in the carbon material according to the invention varies in the range of 1 to 60 vol % in particular 2 to 50 vol %, preferably 5 to 40 vol % based on the carbon material.

Finally, the mass-based silicon and/or tin content (i.e., the mass-based silicon, tin and/or silicon/tin nanoparticle content) in the carbon material according to the invention is in the range of 1 to 70 wt %, in particular 2 to 60 wt %, preferably 5 to 50 wt %, based on the carbon material.

As explained previously, in this optional embodiment, the carbon material according to the invention may also contain graphite. The carbon material preferably contains graphite in molar amounts of 1 to 50 mol %, preferably 5 to 40 mol %, based on the carbon material in this embodiment, the graphite may be present in mass-based amounts of 0.001 to 50 wt %, in particular 0.01 to 45 wt %, preferably 0.1 to 40 wt %, especially preferably 1 to 40 wt %, based on the carbon material. Graphite particles having average particle sizes ($D_{50}$) in the range of 0.1 to 200 µm, in particular 1 to 100 µm, are generally used for this purpose. The BET surface area of the graphite used may vary in the range of 1 to 75 $m^2/g$ especially 2 to 50 $m^2/g$, preferably 5 to 30 $m^2/g$, especially preferably 10 to 20 $m^2/g$. Those skilled in the art are familiar with graphites that may be used to improve the electrical conductivity. These products are available commercially.

In addition, it is possible to provide for the carbon material according to the invention to optionally contain at least one conductivity-improving agent, in particular a conductive carbon black. In this embodiment, the conductivity-improving agent in particular conductive carbon black may be present in molar amounts of 1 to 20 mol preferably 3 to 10 mol %, based on the carbon material. The conductivity-improving agent, especially the conductive carbon black, is usually present in mass-based amounts of 0.001 to 20 wt %, especially 0.01 to 15 wt %, preferably 0.1 to 10 wt %, based on the carbon material. Those skilled in the art are familiar with conductivity-improving agents that may be used for this purpose, in particular conductive carbon blacks, which are also available commercially. Conductivity-improving agents in particular conductive carbon blacks having average particle sizes ($D_{50}$) in the range of 1 to 1.00 nm, in particular 20 to 60 nm, preferably 30 to 50 nm are advantageously used. Conductivity-improving agents suitable for use according to the invention, in particular conductive carbon blacks have BET surface areas in the range of 10 to 200 $m^2/g$ especially 50 to 80 $m^2/g$, preferably 55 to 70 $m^2/g$.

The carbon material according to the invention is characterized by a good electrical conductivity. The electrical conductivity of the carbon material according to the invention is usually in the range of $10^0$ to $10^6$ S/m especially $5 \cdot 10^0$ to $10^5$ S/m. The conductivity of the carbon material according to the invention especially amounts to at least $10^0$ S/m especially at least $10^3$ S/m, preferably at least $10^4$ S/m.

In addition, the present invention—according to a third aspect of the invention—relates to the use of the carbon material according to the invention as an anode material especially for lithium-ion batteries and/or for producing an anode material especially for lithium-ion batteries.

Another subject matter of the present invention—according to a fourth aspect of the present invention—is an anode material which contains the carbon material according to the present invention as described above.

According to a special embodiment, it is possible to provide for the anode material according to the present invention to be made exclusively of the carbon material according to the invention. This is the case in particular when the carbon material according to the invention is processed into molded bodies suitable for use as anodes and also has a sufficient mechanical stability.

Alternatively, however, it is also possible to provide for the carbon material according to the invention to be processed together with other components in particular graphite and/or conductivity-improving agents in particular conductive carbon black and/or binders to form an anode material according to the present invention, which is suitable in particular as an anode material for lithium-ion batteries.

An anode material according to the present invention which is suitable in this context may contain in particular a carbon material according the invention as described above especially in amounts of 5 to 100 wt %, especially 10 to 95 wt %, optionally graphite especially in amounts of 0.001 to 50 wt %, especially 0.01 to 45 wt %, preferably 0.1 to 40 wt %, especially preferably 1 to 40 wt %, optionally at least one conductivity-improving agent, especially conductive carbon black especially in amounts of 0.001 to 20 wt %, especially 0.01 to 15 wt %, preferably 0.1 to 10 wt %, optionally at least one preferably organic binder especially in amounts of 0.01 to 30 wt %, especially 0.1 to 25 wt %, preferably 0.5 to 15 wt %, especially preferably 1 to 1.0 wt %, wherein all the aforementioned amounts for percent by weight are based on the anode material and yield a total of 100 wt %.

In this aforementioned embodiment, such graphites and conductivity-improving agents especially conductive carbon blacks as those described previously may be used. To avoid unnecessary repetition, reference can be made to the preceding discussion in this regard, such that the statements made there apply to this aspect of the invention accordingly.

Those skilled in the art are familiar with binders, in particular organic binders, suitable for use according to the invention, as such. The binders may be any binders that permanently bind and/or hold together the aforementioned components. Preferred binders include polymeric binders preferably polyvinylidene fluoride, polytetrafluoroethylene or polyolefins, especially preferably thermoplastic elastomers in particular ethylene-propylene-diene terpolymers. Gelatin or modified cellulose may also be used as binders.

The anode material according to the invention is characterized by a good electrical conductivity which is in particular in the range of $10^1$ to $10^5$ S/m especially $5 \cdot 10^1$ to $10^4$ S/m. In particular the anode material according to the invention is characterized by a conductivity of at least $10^1$ S/m especially at least $10^2$ S/m preferably at least $10^3$ S/m.

Finally the subject matter of the present invention—according to a fifth aspect of the present invention—is a battery especially a lithium-ion battery preferably in the form of an accumulator, comprising an anode material according to the present invention as defined above and/or a carbon material according to the present invention as defined above.

For additional details regarding the other aspects of the present invention, reference can be made to the preceding discussion regarding the first aspect of the invention and vice-versa to avoid unnecessary repetition, and these statements then apply accordingly with respect to the other aspects of the invention.

Within the scope of the present invention, thus porous silicon- and/or tin-containing products and/or materials which are suitable as the anode material for lithium-ion batteries, in particular are made available. The subject matter of the invention is thus a porous to highly porous material for use as anode material in lithium-ion batteries.

Crystalline silicon nanoparticles, silicon/tin nanocomposite particles, nanoparticies based on silicon/tin alloys or tin nanoparticles produced by gas-phase synthesis or the like, for example, for the aforementioned purpose may typically be dispersed homogeneously in a monomer with subsequent polymerization or a polymer and then polymerized.

It is typically possible to proceed as described below within the scope of the present invention.

Crystalline nanoparticles of silicon and/or tin for the material according to the invention may first be dispersed homogeneously in a monomer which is then polymerized in situ in the presence of the silicon and/or tin or alternatively may be dispersed homogeneously in a polymer (organic). As explained previously, in the case of the monomer, the latter is then polymerized.

The polymers are processed further, for example, to molded articles such as spheres, wafers, blocks or more complex structures and then pyrolyzed thus yielding a carbon species with a large internal surface area (BET) (e.g., typically a few 100 $m^2$/g to 2000 $m^2$/g) and silicon, in and/or silicon/tin nanoparticles embedded therein. In the case of silicon nanoparticles, aggregated (so-called "hard agglomerates") and unaggregated (so-called "soft agglomerates") silicon with an average crystallite size between 1 and 100 nm is especially suitable. Silicon with an average crystallite size between 5 and 50 nm is most especially suitable. The average crystallite size can determined, for example, from histograms with transmission electron micrographs and/or from x-ray diffractograms as well as—in the case of the unaggregated powder—from the BET surface area.

To disperse the silicon, tin and/or silicon/tin nanoparticies in organic monomer or polymers, it is advantageous to first functionalize the particle surface for the purpose of hydrophobization. For this purpose, reactive silanes, for example, may be used for functionalization, chlorosilanes and hexamethyldisilazane being especially preferred, chlorosilanes of the general formulas $SiCl_xR_{4-x}$ where x=1 to 3, where R is an organic radical preferably with the general formula $C_nH_{(2n+1)}$ most especially preferably with n=1 to 6 are preferred for functionalizing.

The silicon, tin and/or silicon/tin nanoparticles functionalized in this way can be bound by dispersion of these particles in a liquid/viscous monomer or polymer, for example, by stirring, kneading, milling in particular in ball mills, ultrasound, extrusion, etc.

Monomers and/or polymers that may be especially suitable for use according to the invention include organic compounds which do not contain any chemically bound oxygen in particular (poly) vinyl chloride, (poly)styrene, (poly)tetrafluoroethylene, (poly)ethylene and (poly) propylene; (poly) styrene is especially suitable, preferably with divinylbenzene as the crosslinking agent.

The silicon and/or tin and/or silicon/tin powder may be nominally undoped or may have a p- or n-type doping of up to $10^{21}/cm^3$. Elements of Main Groups 3 and 5 are preferred (new nomenclature: group 13 and 15) of the periodic system of elements as well as elements from the iron group and especially preferably boron, aluminum, phosphorus and/or iron.

According to the invention, it is possible to produce mechanically strong materials which are even directly accessible in the form of ready-to-use electrodes so that, in the production of anodes, it is possible to completely eliminate the addition of a binder, organic in particular (usually a few weight percent) for production of mechanically strong electrodes.

Another possibility for producing the actual anodes starting from the emitted anode material is to also add graphite and/or conductive carbon black to the dispersion of monomer and/or polymer and silicon, tin and/or silicon/tin nanoparticles in order to improve the uptake capacity for lithium and to improve the electrical conductivity. The addition of graphite may typically amount to 1 to 50 mol %, preferably 5 to 40 mol %, based on the material according to the invention. The addition of conductive carbon black may amount to typically 1 to 20 mol %, preferably 3 to 10 mol %, based on the material according to the invention.

The silicon and/or tin content in the material according to the invention may typically be varied in a wide range. For example, a composition may contain 5 to 90 mol %, preferably 20 to 70 mol % silicon and/or tin based on the material according to the invention.

Additional embodiments, modifications and variations of the present invention are readily apparent and implementable for those skilled in the art in reading the description without going beyond the scope of the present invention.

The following exemplary embodiments are presented only for illustration of the present invention but without limiting the present invention thereto.

EXEMPLARY EMBODIMENTS

Production of Silicon- and/or Tin-Containing Anode Materials According to the Invention 10 g of a surface-oxidized silicon obtained from microwave synthesis and having a BET surface area of 200 $m^2/g$ is mixed with 100 mL hexamethyldisilazane in a round-bottomed flask while stirring vigorously, stirring under nitrogen at a slight vacuum (approximately 900 mbar absolute) until no more ammonia is detectable in the gas phase going over. Next the excess hexamethyldisilazane is distilled off in vacuo.

The silicon powder functionalized in this way is dispersed in 1.00 mL styrene with the help of an ultrasound generator, and then 5 g divinylbenzene and 5 g dibenzoyl peroxide are added one after the other to the dispersion. The suspension is heated in a boiling water bath for 30 minutes while stirring, poured into a mold and cooled.

100 g of the resulting solids are then reduced in size and mixed with 200 mL concentrated sulfuric acid in a round-bottomed flask. The suspension is heated to 160° C. for 30 minutes while stirring vigorously, cooled and filtered.

The filter residue is transferred to a tubular oven and pyrolyzed at 750° C. for 3 hours under nitrogen.

The resulting material is then processed together with a binder and optionally together with graphite and/or conductive carbon blacks to form anodes for lithium-ion batteries.

Tin-based and/or silicon/tin-based anode materials are prepared by a comparable method, using as starting materials surface-oxidized tin composite and/or silicon/tin, produced from microwave synthesis as the starting materials instead of silicon, in deviation from the preceding exemplary embodiment.

The invention claimed is:

1. A method for producing an electrically conductive porous silicon- and/or tin-containing material suitable for the production of anode materials and lithium-ion batteries, wherein:
   (i) silicon nanoparticles and/or tin nanoparticles and/or silicon/tin nanoparticles are introduced into a polymer matrix based on at least one organic polymer in a first process step, wherein the silicon nanoparticles and/or tin nanoparticles and/or silicon/tin nanoparticles are subjected to a surface modification by alkylsilyl group functionalization before being introduced into the polymer matrix, and
   (ii) then in a second process step, the polymer matrix containing the silicon and/or tin and/or silicon/tin nanoparticles is carbonized to carbon, wherein the resulting carbon material has a BET surface area of 100 to 1,750 $m^2/g$.

2. The method according to claim 1, wherein an electrically conductive porous carbon material with the silicon nanoparticles and/or tin nanoparticles and/or silicon/tin nanoparticles intercalated therein is produced and wherein the silicon nanoparticles and/or tin nanoparticles and/or silicon/tin nanoparticles have an average particle size in the range of 1 to 1,000 nm.

3. The method according to claim 1, wherein the silicon nanoparticles and/or tin nanoparticles and/or silicon/tin nanoparticles are crystalline with a crystallinity of at least 70% and wherein the silicon nanoparticles and/or tin nanoparticles and/or silicon/tin nanoparticles have a BET surface area in the range from 1 to 2,000 $m^2/g$.

4. The method according to claim 1, wherein the silicon nanoparticles and/or tin nanoparticles and/or silicon/tin nanoparticles contain at least one doping element comprising a p-type and/or n-type doping, where the at least one doping element is selected from the group consisting of boron, aluminum, phosphorus and/or iron as well as mixtures thereof.

5. The method according to claim 1, wherein the at least one organic polymer does not contain any chemically bound oxygen, and wherein the at least one organic polymer is selected from the group consisting of polyvinyl chloride, polyacrylonitrile, polystyrene, polytetrafluoroethylene, polyethylene and polypropylene and mixtures thereof.

6. The method according to claim 1, wherein the carbonization is performed under at least essentially inert conditions in the absence of oxygen and wherein the carbonization is performed at temperatures in the range from 300 to 2,000° C. for a period from 0.1 to 20 hours.

7. The method according to claim 1, wherein graphite and/or at least one conductivity improving agent is added in the course of the process.

* * * * *